United States Patent [19]

Watts et al.

[11] Patent Number: 4,464,937
[45] Date of Patent: Aug. 14, 1984

[54] EXTENSOMETER READOUT CIRCUIT

[75] Inventors: David E. Watts, Eden Prairie; Robert W. Winters, Burnsville, both of Minn.

[73] Assignee: MTS Systems Corporation, Eden Prairie, Minn.

[21] Appl. No.: 421,147

[22] Filed: Sep. 22, 1982

[51] Int. Cl.³ .............................................. G01B 7/16
[52] U.S. Cl. ...................................... 73/772; 73/788; 73/794; 73/796; 73/826
[58] Field of Search ................. 73/772, 788, 789, 794, 73/796, 818, 826; 314/114, 115; 33/148 D

[56] References Cited

U.S. PATENT DOCUMENTS 3,537,004 10/1970 Strock ................................. 324/115
3,714,569 1/1973 Bruning et al. ...................... 324/115
3,789,508 2/1974 Meline ............................... 33/148 D
4,131,846 12/1978 Stone .................................. 324/115

Primary Examiner—Anthony V. Ciarlante
Attorney, Agent, or Firm—Kinney & Lange

[57] ABSTRACT

An extensometer readout circuit conditions a strain information signal, representing strain of a specimen being tested, in such a way that yield point measurements and final elongation measurements of such specimen may be concurrently obtained. The strain information signal is provided by subjecting the specimen to a tensile or compression test by any conventional means known in the prior art. The strain information signal is first applied to a preamplifier. The preamplified strain information signal is then concurrently applied to both a high gain amplifier and a low gain amplifier. The signal obtained from the high gain amplifier is used for performing modulus calculations and for obtaining yield point measurements. The signal obtained from the low gain amplifier is used to obtain the total elongation measurement.

12 Claims, 2 Drawing Figures

EXTENSOMETER READOUT CIRCUIT

BACKGROUND OF THE INVENTION

1. Field of the Invention.

The present invention relates to signal conditioning circuitry and in particular to a circuit for conditioning a strain information signal.

2. Description of the Prior Art.

Strain measurements are normally given as a percentage, the percentage being a ratio of specimen elongation or compression to original length. In a typical tensile or compression test, there are two strain measurement points of particular interest. The first is known as the yield point.

The yield point marks the upper limit of the elastic strain range of a specimen. Throughout the elastic range, the modulus calculation (ratio of stress to strain) remains constant. At the yield point a discontinuity occurs and the ratio of stress to strain is no longer constant. The yield point for most metals occurs within a strain range of 0 to 1% although it may be as high as 5% for some nonmetal engineering materials. To make an accurate yield point determination, successive strain measurements must be taken and corresponding modulus calculations made. The difference between successive measurements is very small when the material is within its elastic range. High resolution of the strain information signal is therefore required. To achieve the necessary resolution high amplification of the strain information signal is needed. This results in the amplifier being useable for only a narrow range of strains before its output saturates.

The measurement of strain after yield and before failure is also of interest. Elongation of most materials fall within a range of 20-60% strain from yield to failure and thus much less resolution is required. The point of failure is called the ultimate elongation point and the elongation between yield and failure is called "ultimate elongation" herein. Specimen geometry normally does not allow a test to be performed with more than one extensometer. Ultimate elongation measurements are generally made by reassembling the broken specimen and measuring the length between prepunched gage marks. This method of measuring elongation is suspect. The prepunched gage marks often "smear" during the test and introduce error into the measurement. Many materials also exhibit notch sensitiveness and will consistently fail at the gage marks. The reassembly method is neither fast or accurate.

To summarize, yield point measurement and measurements of ultimate elongation are mutually exclusive under current test conditions. The high resolution needed to make accurate yield point measurements does not permit the amplifier range needed to measure final elongation. The wide range required to measure final elongation gives poor modulus and yield point results.

SUMMARY OF THE INVENTION

The extensometer readout circuit of the present invention is a strain information signal conditioning system for providing the accuracy required for modulus calculations and yield point measurements and signal range required for ultimate elongation measurements concurrently. A strain information signal may be obtained by subjecting the test specimen to any conventional compression or tensile testing means. The strain information signal is first applied to a preamplifier means for providing a preamplified strain information signal. The preamplified strain information signal is then applied to a high gain amplifier means. The high gain amplifier means provides a high resolution strain information signal. The high resolution strain information signal has sufficient accuracy so that modulus calculations and yield point measurements may be obtained when the specimen is being subjected to low strains. The preamplified strain information signal is also applied to a low gain amplifier means. The low gain amplifier means provides a low resolution strain information signal so that the range required to make ultimate elongation measurements is obtained when the specimen is under high strain.

In preferred embodiments of the present invention, the preamplifier means will have a gain of 500. The high gain amplifier means has a gain of 10 to obtain measurements when the specimen is subjected to 0 to 5% strain. The low gain amplifier means has a gain of one for obtaining measurements when the specimen is subjected to strains up to 60%.

DETAILED DESCRIPTION OF THE PREFERRED EMBODIMENTS

Figure 1:
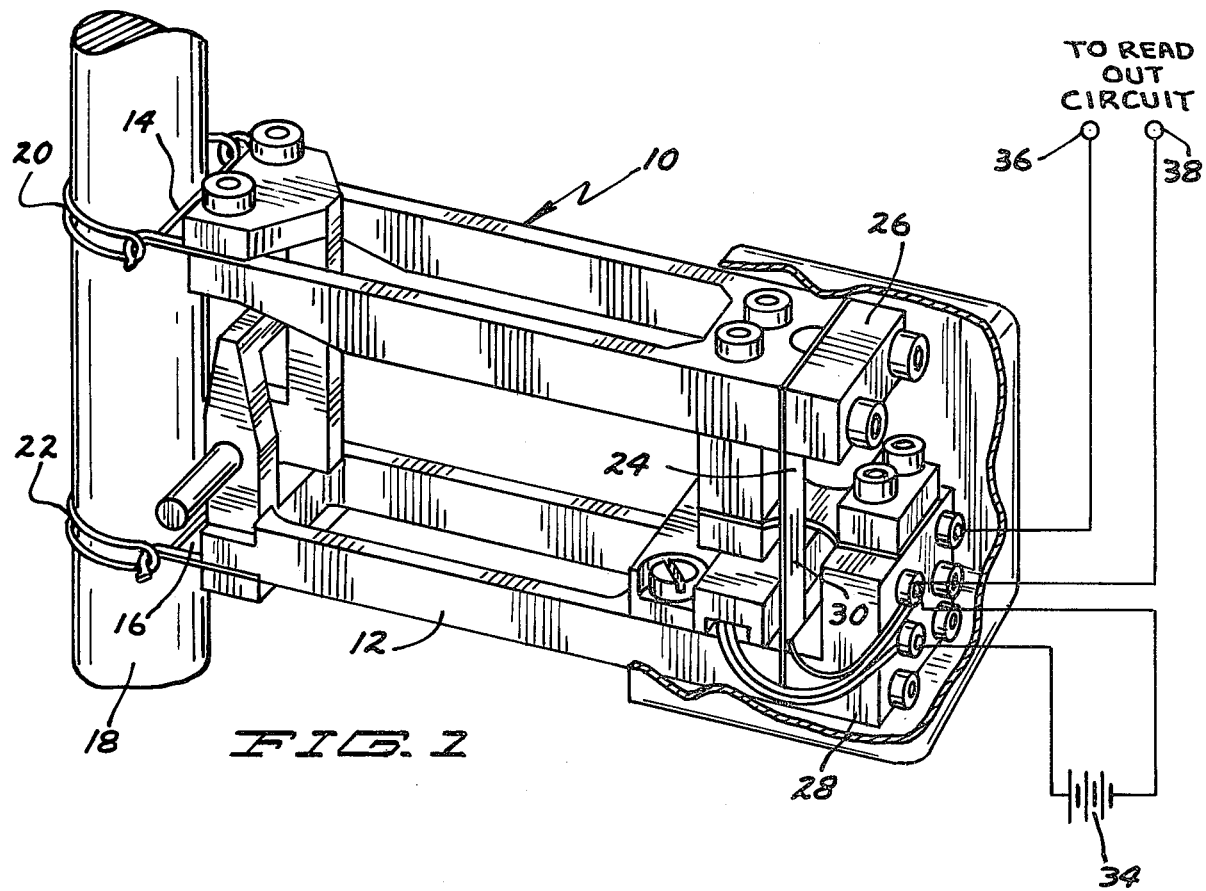
FIG. 1 is a view of an extensometer known in the art shown installed on a specimen to be tested and using the readout circuit of the present invention.
Figure 2:
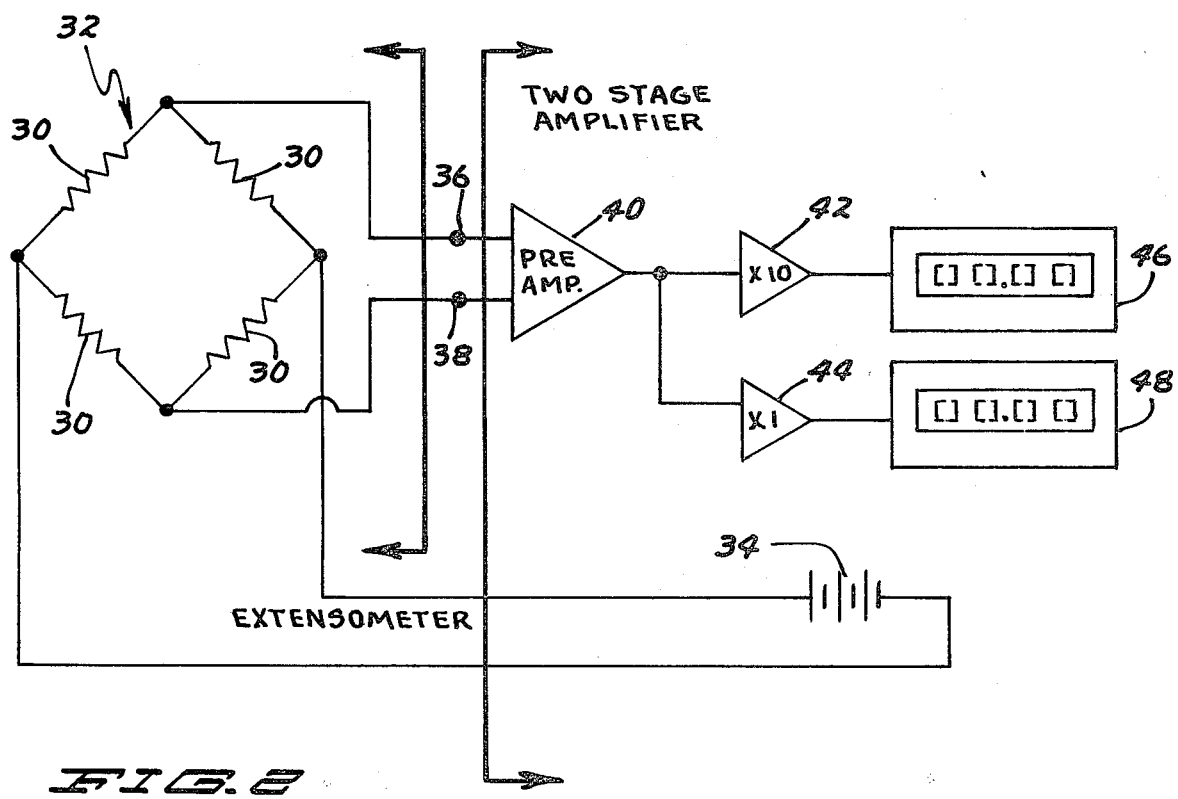
FIG. 2 is a schematic representation of the extensometer strain sensing circuit and the readout circuit of the present invention.

A preferred embodiment of the extensometer readout circuit of the present invention is shown in FIG. 2. The extensometer readout circuit is designed to be used with currently available extensometers or any which may be developed in the future. FIG. 1 shows on extensometer which is representative of those known to the art.

The extensometer shown in FIG. 1 is described in U.S. Pat. No. 3,789,508. The extensometer includes upper arm 10 and lower arm 12. The outer end of each arm carries a knife-edge blade 14 and 16, respectively. Specimen 18 is to be tested in a conventional load frame and the knife-edge blades 14 and 16 are held against the specimen by elastic bands 20 and 22.

Flexure element 24 is attached to upper arm 10 with a block 26 and suitable cap screws, and onto lower arm 12 with a block 28 and suitable cap screws. Mounted on flexure element 24 are four strain gages 30, one of which is indicated in FIG. 1. The four strain gages 30 are typically connected to form a bridge 32 as shown in FIG. 2. A potential is applied to two opposite junctions of bridge 32 by voltage source 34.

When the extensometer is used in a specimen test movement of knife-edge blades 14 and 16 toward or away from each other as a load is applied to the specimen will cause a change in the resistance of strain gages 30 mounted on flexure element 24. A strain information signal proportional to the strain on specimen 18 will be produced at terminals 36 and 38. Terminals 36 and 38 are connected to bridge circuit 32 at junctions opposite those of voltage source 34.

The extensometer readout circuit of the present invention comprises a preamplifier 40, high gain amplifier 42, low gain amplifier 44, high gain readout circuitry/display 46 and low gain readout circuitry/display 48. Preamplifier 40 receives the strain information signal present on terminals 36 and 38. The preamplified strain information signal is applied as an input to the inputs of both high gain amplifier 42 and low gain amplifier 44. The output of high gain amplifier 42 is applied to high gain readout circuitry/display 46 while the output of low gain amplifier 44 is applied to low gain readout circuitry/display 48.

Preamplifier 40 is used because of the low level of the strain information signal present on output terminals 36 and 38 of the extensometer. Preamplifier 40 will normally have a gain in the range of 500. Any conventional amplifier configuration may be used to provide this amplification.

Accurate data on the strain of specimen 18 is required for the modulus calculation. To achieve the required resolution, the preamplified strain information signal is applied to high gain amplifier 42. High gain amplifier 42 will typically have a gain of 10. Any conventional amplifier configuration may be used to produce this gain. Modulus calculations are required before the specimen reaches its yield point. The yield point usually occurs within a strain range of 0-0.6%. It may be as high as 5% however. High gain amplifier 42 will produce an amplified strain information signal having the resolution required to make accurate modulus calculations within strain ranges of 0 to 5%.

The amplified strain information signal produced by high gain amplifier 42 is applied to high gain circuitry/display 46. High gain readout circuit/display 46 will condition the amplified strain information signal and display the strain in a useable form. Any conventional form of readout display circuitry may be used. In one preferred embodiment high gain readout circuitry/display 46 provides a digital display of strain information. In another preferred embodiment high gain readout circuitry/display 46 is an XY recorder of conventional design. Specimen load is displayed on the X axis and the strain corresponding to each load on the Y axis.

Ultimate elongation measurements, the point at which the specimen breaks, typically fall within the range of 20-60% strain. At these strain levels the strain information signal will saturate the output of high gain amplifier 42. The accuracy needed for modulus calculations, therefore, limits the range of material strains which may be displayed. Ultimate elongation measurements meanwhile do not require the accuracy of modulus calculations. For this reason the preamplified strain information signal is also applied to low gain amplifier 44.

Low gain amplifier 44 provides an amplified strain information signal having low resolution but it also has the range required to measure ultimate elongation at strains up to 60%. Low gain amplifier 44 typically has a gain of one. This amplification may be achieved using any conventional amplifier design. The low gain strain information signal is applied to low gain readout circuitry/display 48. Low gain readout circuitry/display 48 may be of any conventional type. Preferred embodiments of low gain readout circuitry/display 48 take the form of either a digital display or an XY recorder.

To summarize, the extensometer readout circuit of the present invention first preamplifies a strain information signal received from a conventional extensometer. The preamplified strain information signal is then applied concurrently to a high gain amplifier and to a low gain amplifier. The high gain amplifier yields accurate strain measurements in the range of 0 to 5%. These measurements are needed to perform modulus calculations and determine the specimen yield point. The low gain amplifier provides a strain information signal having range necessary to measure ultimate elongation. Both the high gain strain information signal and the low gain strain information signal are applied to corresponding readout circuitry and display. The present invention provides a fast and accurate indication of specimen yield point and ultimate elongation.

Although the present invention has been described with reference to preferred embodiments, workers skilled in the art will recognize that changes may be made in form and detail without departing from the spirit and scope of the invention.

What is claimed is:

1. A method of conditioning a strain information signal developed from a specimen so that both yield point and final elongation measurements may be continuously monitored and obtained, the method comprising the steps of:
    applying the strain information signal to a high gain amplification means to obtain high resolution of a narrow portion of the strain information signal when the specimen is subjected to low strain; and
    concurrently applying the strain information signal to a low gain amplification means to also separately obtain low resolution of a wide portion of the strain information signal when the specimen is being subjected to a high strain.

2. The method of claim 1 wherein the strain information signal is applied to preamplification means prior to providing the strain information signal to the respective amplification means.

3. The method of claim 1 wherein the high gain amplification means has a gain of substantially 10 for obtaining measurements when the specimen is subjected to 0 to 5% strain.

4. The method of claim 1 wherein the low gain amplification means has a gain of substantially one for obtaining measurements when the specimen is subjected to 0 to 60% strain.

5. Means for conditioning a strain information signal received from an extensometer mounted on a specimen which is being subjected to a load which strains the specimen, the conditioning means comprising:
    high gain amplifier means for amplifying the strain information signal so that high resolution of a narrow range of the strain information signal is obtained when the specimen is subjected to low strain; and
    low gain amplifier means for amplifying the strain information signal so that low resolution of a wide range of the strain information signal is obtained concurrently with the high resolution signal to provide a usable signal when the specimen is subjected to high strain.

6. The means of claim 5 and preamplifier means to provide the strain information signal to both the high and low amplifier means concurrently.

7. The means of claim 5 wherein the high gain amplifier means has a gain of 10 for obtaining measurements when the specimen is subjected to 0 to 1% strain.

8. The means of claim 5 wherein the low gain amplifier means has a gain of 1 for obtaining measurements when the specimen is subjected to 0 to 60% strain.

9. A signal conditioning system for conditioning a strain information signal so that signal accuracy required for modulus calculations and signal range required for ultimate elongation measurements are both obtained, the system comprising:

high gain amplifier means connected to receive the strain information signal for providing an amplified strain information signal having high resolution when the specimen is under low strains so that accuracy necessary to perform modulus calculations and yield measurements is obtained; and low gain amplifier means connected to receive the strain information signal for providing an amplified strain information signal having low resolution when the specimen is under high strains so that a strain information signal having a range required for ultimate elongation measurements is obtained.

10. The system of claim 9, including pre-amplifier means to pre-amplify the signal prior to transmission to the high gain amplifier means and low gain amplifier means.

11. The system of claim 10 wherein the high gain amplifier means provides a gain of 10.

12. The system of claim 10 wherein the low gain amplifier means provides a gain of 1.

* * * * *